H. BAUDISCH.
TURBINE.
APPLICATION FILED FEB. 17, 1917.
1,379,796.
Patented May 31, 1921.
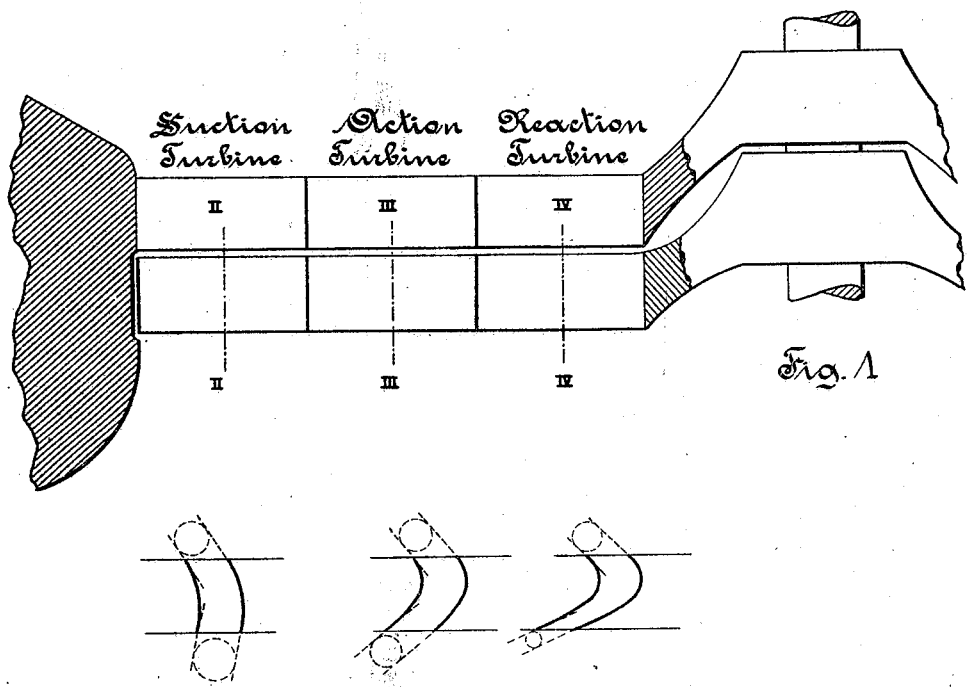
Inventor
Hans Baudisch
by
Attorney

UNITED STATES PATENT OFFICE.

HANS BAUDISCH, OF VIENNA, AUSTRIA, ASSIGNOR TO ALLIS-CHALMERS MANUFACTURING COMPANY, OF MILWAUKEE, WISCONSIN, A CORPORATION OF DELAWARE.

TURBINE.

1,379,796.    Specification of Letters Patent.    Patented May 31, 1921.

Application filed February 17, 1917. Serial No. 149,709.

*To all whom it may concern:*

Be it known that I, HANS BAUDISCH, a citizen of Austria, residing at Vienna, in the State of Austria, have invented new and useful Improvements in Turbines, of which the following is a specification.

As is well known, in an action turbine, the velocity at which the water issues from the guide blade ring or stator is equal to the so called head velocity. The flux through a bucket of the runner or rotor takes place in such a manner that the jet of water applies itself to the concave face of a vane without touching the convex face of the following vane, whereby a free water surface swept by the air is formed in the bucket. It is equally well known that, in order to obtain this operation, an exactly given relation must exist between the angle which the jet makes with the guide blade ring or stator when issuing therefrom and the angle it makes with the runner or rotor when entering it, or in other words, exactly given relations between the issue face of the guide blade ring or stator and the entrance face of the runner or rotor. Furthermore, the formation of the free flow of water in the bucket of the runner must also be promoted by providing each bucket, in its lateral side formed by the rim, with an orifice for the admission of air, or by causing the air to enter the buckets through the clearance between the stator and rotor, in the manner of the well known clearance ventilation.

When this admission of air into the buckets of such a turbine, where there is full admission of water, that is, into which water is admitted along the whole circumference of the guide blade ring or stator, is prevented by suitable construction, similar to that of a reaction turbine, all runner buckets will forthwith fill with water, and in order to keep them filled, the outlet velocity of the guide blade ring must grow greater than the head velocity. Consequently a lower pressure than that of the surrounding air will prevail in the clearance between the guide blade ring or stator and the runner or rotor, which will exert a sucking action upon the guide blade ring like the spheric widening of an ejector. Thereby, one is enabled to cause considerably more water per unit of time to work in the turbine without altering the dimensions of the runner.

In the drawing,

Figure 1 is a partial, sectional, diagrammatic view of a combined reaction, limit and underpressure turbine.

Fig. 2 is a detail, sectional, diagrammatic view showing the development of a cylindrical section taken through the suction underpressure turbine, on line II—II, Fig. 1.

Fig. 3 is a detail, sectional, diagrammatic view showing the development of a cylindrical section taken through the action or limit turbine, on line III—III, Fig. 1.

Fig. 4 is a detail, sectional, diagrammatic view showing the development of a cylindrical section taken through the reaction or pressure turbine, on line IV—IV, Fig. 1.

The circles shown in Figs. 2, 3 and 4 indicate the proportional relation existing between the cross sectional area of the space between blades.

In order more precisely to define the relations heretofore referred to between the angles and faces, the second main equation about full admission turbines with wholly filled buckets must be considered. Supposing the water vertically to discharge from the runner buckets, this equation may be written as follows:

$$C_0 = \sqrt{g\eta h} \sqrt{\sin \beta_1 / \sin (180 - \alpha_0 - \beta_1) \cos \alpha_0}.$$

In this equation $C_0$ is the outlet velocity of the guide blade chamber, $g$ the acceleration of gravity, $\eta h$ the so-called working fall, $\beta_1$ the angle which the relative direction of flow of admission into the runner makes with admission circumferential direction of flow, $\alpha_0$ the angle which in the inlet triangle the outlet velocity of the guide blade ring makes with the circumferential velocity. There will be $$C_0 > \sqrt{2g\eta h}$$

if $$\sqrt{2} > \sqrt{\sin \beta_1 / \sin (180 - \alpha_0 - \beta_1) \cos \alpha_0},$$

that is to say if $$180 - \beta_1 < 2\alpha_0.$$

It must however be taken into consideration that these plain relations of the angles are only approximately correct, as they are derived from equations of classic hydraulics which do not come true in reality and from which they have taken their rise by means of substantial simplification.

While in reaction turbines, as is well known, the transmission of work is mainly effected by the acceleration of the water in the runner buckets, and in action turbines by the change in the direction of flow of the water along the concave faces of the runner vanes, it is obtained in turbines as sucking jet, suction or underpressure, disclosed as the invention which is the subject of my copending application Serial No. 96731, matured to Patent 1,347,578, granted July 27, 1920, by retardation of the water in the runner buckets. Consequently, the necessity of diversity in the directions of flow between the runner blades is reduced in range and it follows therefrom that the runner vanes of this turbine may be made with angles and cross section which, without decrease of the efficiency of the runner, give little deviation and strongly differ from those commonly used with action turbines. Thereby one is enabled to use relations of angles corresponding to great speed of revolution.

Such turbines may, like any reaction turbine, be built with a suction tube, and they may be executed as purely axial flow turbines, purely radial flow turbines or mixed turbines.

According to the fact whether the clearance pressure of a full admission turbine with wholly filled runner buckets is greater than, equal to or less than the pressure behind the runner, the turbine is, as is now well known, called either a pressure jet or reaction turbine, or a limit turbine, or a sucking jet or underpressure turbine. In other words, if the pressure in the clearance between the stationary guide blade ring and the runner is greater than the pressure in the discharge from the runner, the turbine is of the reaction type; if equal, a limit turbine; and if less, an underpressure turbine.

The forms of runner blades used in the construction of full admission turbines with wholly filled runner buckets are based upon a blade scheme worked out by dividing the current which flows through the runner into a number of branch currents and the turbine into a number of concentric part turbines. These part turbines may be so constructed that each of them has a different clearance pressure. Thereby one is enabled to build reaction or underpressure turbines in which the clearance pressure varies along the whole breadth of the runner, from point to point, in such a manner that all points of the breadth show different clearance pressure, but that at each point the clearance pressure is of a constant value.

The invention consists in so building a full admission turbine with wholly filled buckets that some of its concentric part turbines are reaction turbines, some others limit turbines, and yet others sucking jet turbines. Thereby, the surplus pressure existing in the clearance beyond the pressure which prevails behind the runner, is in the whole breadth of the runner caused to pass from a positive value above zero to a negative value.

In cases when one is obliged to build all part turbines of a full admission turbine either as reaction, or limit, or underpressure turbines, exceedingly complicated blade sections will result, more especially so with turbines the runners of which have a large admission area. As a rule, the blade sections concerned will be those near the outer or the inner rim. To these complicated blade sections correspond complicated blade faces, which often render the manufacture difficult. Another drawback of these complicated blade sections lies in the water not being able to follow in all points the path prescribed by the blade sections, in consequence whereof cavities filled with whirling water form within the buckets. In order to overcome these difficulties of manufacture and to avoid the unsteady flow, consequently in order more favorably to shape the blade faces from the hydraulic point of view, one is often obliged, as is well known, to lengthen some blade sections, so that more favorable conditions of curvature and of alteration of the directions of the flow are obtained. Thereby the area of the blade faces is enlarged, and this is always done at the cost of the amount of friction of the water in the runner buckets.

If, however, one is, according to this invention, enabled so to shape the blades that, for instance, the innermost part turbines are built as reaction turbines, an intermediate part turbine as a limit turbine, and the outermost turbines as underpressure turbines, one may obtain plain blade sections in those part turbines, which heretofore had turned out unsatisfactory. By the construction of such a combined reaction, limit and underpressure turbine, the adoption of short blade sections for all part turbines is not impaired, but on the contrary, the latitude in the choice of the blade faces is increased without impairing the steadiness of the flux in the runner buckets.

Such a combined reaction, limit and underpressure turbine may be built as an axial flow, radial flow or axial and radial flow turbine with or without a suction tube.

Having thus described my invention, what I claim is:

1. In a full admission turbine having wholly filled runner buckets, the combination with the guide blade ring or stator of a runner or rotor having buckets, a portion of each bucket being of the reaction type, another portion being of the limit type and yet another portion being of the sucking jet type, whereby in the clearance space between the stator and the rotor the surplus pressure over the pressure prevailing behind the runner is caused gradually to pass from a positive value to zero and thence to a negative value.

2. In a full admission turbine, a runner adapted for having wholly filled runner buckets, comprising part turbines of the reaction, limit and underpressure types.

3. In a full admission turbine, a runner adapted for having wholly filled runner buckets, comprising an innermost part turbine of the reaction type, an intermediate part turbine of the limit type, and an outermost part turbine of the underpressure type.

4. In a full admission turbine, the combination of part turbines of the reaction, limit and underpressure types.

5. In a full admission turbine, the combination of an innermost part turbine of the reaction type, an intermediate part turbine of the limit type, and an outermost part turbine of the underpressure type.

6. In a full admission turbine, the combination of part turbines of the reaction and underpressure types.

7. In a full admission turbine, the combination of part turbines of the limit and underpressure types.

8. In a full admission turbine, the combination of an innermost part turbine of the reaction type, and an outermost part turbine of the underpressure type.

9. In a full admission turbine, the combination of an innermost part turbine of the reaction type, an outermost part turbine of the underpressure type, and an intermediate part turbine constructed and arranged to coöperate with the other two.

HANS BAUDISCH.